US007160434B2

(12) United States Patent
Becker et al.

(10) Patent No.: US 7,160,434 B2
(45) Date of Patent: Jan. 9, 2007

(54) THERAPEUTIC ELECTROLYSIS DEVICE

(75) Inventors: Hans Becker, Dubuque, IA (US); Robert E. Moroney, Aurora, CO (US)

(73) Assignee: Robert E. Moroney, LLC, Aurora, CO (US)

( * ) Notice: Subject to any disclaimer, the term of this patent is extended or adjusted under 35 U.S.C. 154(b) by 569 days.

(21) Appl. No.: 10/396,188

(22) Filed: Mar. 24, 2003

(65) Prior Publication Data

US 2003/0216794 A1 Nov. 20, 2003

Related U.S. Application Data

(60) Provisional application No. 60/366,773, filed on Mar. 22, 2002.

(51) Int. Cl.
*C02F 1/461* (2006.01)

(52) U.S. Cl. ...................... 205/742; 205/743; 205/744; 204/267; 204/230.2

(58) Field of Classification Search ................ 205/742, 205/743, 744; 204/267, 230.2
See application file for complete search history.

(56) References Cited

U.S. PATENT DOCUMENTS

| | | | | |
|---|---|---|---|---|
| 2,622,601 A | | 12/1952 | Nemec | |
| 3,881,471 A | | 5/1975 | Grube | 128/65 |
| 3,918,459 A | | 11/1975 | Horn | 128/419 R |
| 4,023,574 A | | 5/1977 | Nemec | 128/420 |
| 4,048,031 A | | 9/1977 | Valanti | 204/149 |
| 4,141,359 A | | 2/1979 | Jacobsen et al. | 128/172.1 |
| 4,192,297 A | | 3/1980 | Labrecque | 128/66 |
| 4,337,136 A | | 6/1982 | Dahlgren | 204/242 |
| 4,620,529 A | | 11/1986 | Kurosawa | 128/66 |
| 4,712,538 A | | 12/1987 | Hardie et al. | 128/24.1 |
| 5,224,927 A | | 7/1993 | Tapper | 604/20 |
| 5,324,317 A | | 6/1994 | Reiss | 607/67 |
| 5,344,384 A | | 9/1994 | Ostrow et al. | 600/13 |
| 5,364,512 A | | 11/1994 | Earl | 204/228 |
| 5,534,120 A | * | 7/1996 | Ando et al. | 205/464 |
| 5,620,463 A | | 4/1997 | Drolet | 607/3 |
| 5,741,317 A | | 4/1998 | Ostrow | 607/85 |
| 5,843,292 A | * | 12/1998 | Spiros | 204/258 |
| 5,893,977 A | | 4/1999 | Pucci | 210/739 |
| 5,954,939 A | * | 9/1999 | Kanekuni et al. | 205/742 |
| 6,017,461 A | | 1/2000 | Garvey et al. | 210/748 |

(Continued)

FOREIGN PATENT DOCUMENTS

WO WO00/00671 * 1/2000

(Continued)

OTHER PUBLICATIONS

"About the Bio-Cleanse Technologies Company", Bio-Cleanse Technologies, Available at http://www.bioclease.info/aboutus.html, 2 pages, Oct. 15, 2004.

(Continued)

*Primary Examiner*—Arun S. Phasge
(74) *Attorney, Agent, or Firm*—Sheridan Ross P.C.

(57) ABSTRACT

An electrolysis device is provided. The electrolysis device includes an ionizer unit having first and second plate assemblies that each provide a different surface area that is contacted by water when the unit is in use. The plate assemblies may each provide a different surface area by providing a different number of plates. The plate assemblies are formed from integral pieces of material, to enhance the reliability of the device. The present invention further provides a control unit programmed to provide an output to the ionizer unit that varies in polarity over time.

22 Claims, 11 Drawing Sheets

U.S. PATENT DOCUMENTS

| | | | | |
|---|---|---|---|---|
| 6,212,432 | B1 | 4/2001 | Matsuura | 607/76 |
| 6,315,886 | B1 * | 11/2001 | Zappi et al. | 205/701 |
| 6,524,453 | B1 * | 2/2003 | De Souza et al. | 204/270 |
| 6,555,071 | B1 | 4/2003 | Skrinjar | |
| 2003/0042210 | A1 | 3/2003 | Skrinjar | |

FOREIGN PATENT DOCUMENTS

| | | |
|---|---|---|
| WO | WO 01/51122 A1 | 7/2001 |
| WO | 02/18277 | 3/2002 |

OTHER PUBLICATIONS

"The Aqua Chi Machine", Available at http://www.waterchi.com/index.html, 3 pages, Dec. 8, 2002, Depicted device available as early as Dec. 1, 2001.

"The Aqua Chi Machine!, How it Works!", Available at http://www.waterchi.com/howacworks.html, 3 pages, Dec. 8, 2002, Depicted device available as early as Dec. 1, 2001.

"Assembly of the Water Module", Bio-Cleanse Technologies, Available at http://www.biocleanse.info/pop_assembly.php, 6 pages, Oct, 13, 2004, Depicted device available as early as Jan. 1, 2001.

"BCT-PER Instruction Sheet", Bio-Cleanse Technologies, LLC., Available at http://www.biocleanse.info/pdf/instructions_bctper.pdf, 2 pages, Feb. 14, 2005, Depicted device available as early as Jan. 1, 2001.

"BCT-PER Spec Sheet/Power Supply", Bio-Cleanse Technologies, LLC., Available at http://www.biocleanse.info/pdf/specsheet_powersupply_bctper.pdf, 1 page, Feb. 14, 2005, Depicted device available as early as Jan. 1, 2001.

"BCT-PRO Instruction Sheet", Bio-Cleanse Technologies, LLC., Available at www.biocleanse.info/products_bct_pro.html, 2 pages, May 7, 2005, Depicted device available as early as Jan. 1, 2001.

"The Bio-Cleanse Field Enhancer", Bio-Cleanse Technologies, product brochure, 2 pages, undated, Device available as early as Jan. 1, 2001.

"The Bio-Cleanse Technologies Products", Bio-Cleanse Technologies, Available at http://www.biocleanse.info/products,html, 5 pages, May 7, 2005, Device available as early as Jan. 1, 2001.

"The Bio-Cleanse Unit - Operating Instructions", Cellular Energizing and Cleansing, Aurora Colorado, 10 pages, undated, Device available as early as Jan. 1, 2001.

"Dual Port BCT-PRO Spec Sheet", Bio-Cleanse Technologies, LLC., Available at www.biocleanse.info/products_bct_pro.html, 1 page, May 7, 2005, Depicted device available as early as Jan. 1, 2001.

"Erchonia, EB 305 - Energy Balancer", Energy Balance Resources, San Diego, CA, 3 pages, undated, Depicted device available as early as Apr. 1, 2001.

Erchonia EB 305 Photographs, 6 pages, Depicted device available as early as Apr. 1, 2001.

"Frequently Asked Questions", Energy Balance Resources, San Diego, CA, 5 pages, undated, Device available as early as Apr. 1, 2001.

"Ionization Therapy: Modern Technology Applied to an Ancient Problem", Staff Writer, Explore! For the Professional, USA, 1 page, 2002.

"Operation and Maintenance Manual, EB305", Erchonia Medical, Inc., Mesa, AZ, 16 pages, undated, Device available as early as Apr. 1, 2001.

"A Personal Experience", Bio-Cleanse Technologies, product brochure, 2 pages, undated, Device available as early as Apr. 1, 2001.

"Q2 Energy Spa, Energy Through Water: History", Available at http://www.qenergyspa.com/history.htm, 2 pages, undated, Depicted device available as early as Aug. 1, 2000.

"Q2 Energy Spa, Energy Through Water. Products", Available at http://www.qenergyspa.com/products.htm, 3 pages, undated, Depicted device available as early as Aug. 1, 2000.

"Q2 Energy Spa, Energy Through Water. The Q2 ENERGYspa", Available at http://www.qenergyspa.com, 2 pages, undated, Depicted device available as early as Aug. 1, 2000.

"Results of Water Testing", Cellular Energizing and Cleansing, Aurora, CO, 3 pages, Aug. 1, 2001.

"Toxins Found in Americans Spur Concern", Borenstein, Seth, The San Diego Union-Tribune, 1 page, Jan. 31, 2003.

"Tri-Vortex Charger Technology", Bio-Cleanse Technologies, LLC., http://www.biocleanse.info/trivortex.html, 2 pages, Oct. 13, 2004, Depicted device available as early as Jan. 1, 2001.

"Water Analysis, EB-305", Erchonia, 1 page, Jan. 2003.

* cited by examiner

THERAPEUTIC ELECTROLYSIS DEVICE

CROSS REFERENCE TO RELATED APPLICATIONS

This application claims the benefit of U.S. Provisional Patent Application Ser. No. 60/366,773, filed Mar. 22, 2002, the entire disclosure of which is incorporated by reference herein.

FIELD OF THE INVENTION

The present invention relates to an electrolysis device for use in connection with therapeutic purposes. In particular, the present invention relates to a device capable of efficiently ionizing water for therapeutic uses.

BACKGROUND OF THE INVENTION

Electrolysis involves ionizing water by passing an electrical current through water. When water is ionized, the individual water molecules are split into their constituent elements, namely hydrogen ions (H+) and hydroxy ions (OH−).

By creating a preponderance of either negative ions or positive ions in water, desirable effects can be realized. For example, it is believed that charged particles can be drawn from the body by placing a body part, such as the feet, in a water bath having a preponderance of negative ions or of positive ions. For example, metal cations are attracted to alkaline water, or water in which a preponderance of negative ions has been produced.

Existing electrolysis devices for use in connection with therapeutic applications are inefficient. In particular, such devices require a relatively large amount of electrical power, while producing a relatively small shift in the number of positive ions present in the water relative to the number of negative ions present in the water. In addition, existing devices have been unreliable. In particular, such devices have suffered from failures in connections between components made at locations that are under water when the device is in operation.

In addition, existing devices typically provide for timed control of the electrolysis process. However, no provision is generally made for automatically alternating between producing a preponderance of negative ions and producing a preponderance of positive ions.

For the reasons set forth above, it would be desirable to provide an electrolysis device for therapeutic purposes that was capable of efficiently creating a preponderance of negative or positively charged ions in a water bath. In addition, it would be desirable to provide such a device that eliminated electrical connections between separately formed components in locations that are submerged in the water bath during operation of the device. Furthermore, it would be advantageous to provide a device that incorporated a controller capable of assisting a user in achieving the desired therapeutic effect. In addition, it would be desirable to provide such a device that was economical to produce.

SUMMARY OF THE INVENTION

The present invention relates to an electrolysis device that ionizes water for use in connection with therapeutic purposes.

The present invention generally includes an ionizer unit having two integral plate assemblies, a control unit, and a power conduit. Each of the plate assemblies has a terminal portion. In accordance with an embodiment of the present invention, the first of the two plate assemblies has an odd number of plates while the second plate assembly has an even number of plates. In accordance with another embodiment of the present invention, the first and second plate assemblies have different surface areas. To create the electric field necessary to effectively ionize water, the plate assemblies are interposed such that plates of the plate assembly with an odd number of plates is separated by a gap from plates of the plate assembly with an even number of plates. In order to maintain the gaps between the plates, the plate assemblies may be held by or within a frame. Each plate assembly includes an electrical terminal that is interconnected to a corresponding terminal of the control unit by a conduit. In accordance with still another embodiment of the present invention, the plate assemblies are formed from integral pieces of material, removing the need to form interconnections between the plates of a given plate assembly during manufacture.

According to an embodiment of the present invention, the current output by the terminals of the control unit is limited. In addition, the polarity of the output at the terminals of the control unit may be varied according to stored programs, or according to a selection entered by a user.

The present invention also provides a method for ionizing water. According to the method, an output voltage is provided at the terminals of a power unit for a first period of time, the polarity at the output terminals is switched and the second polarity is provided for a second period of time. According to other embodiments, various output polarities and associated times may be available for selection by a user as preprogrammed outputs.

Additional advantages and features of the present invention will become more apparent from the following description, particularly when taken together with the accompanying drawings.

DETAILED DESCRIPTION

In accordance with the present invention, a method and apparatus for providing a therapeutic electrolysis device are disclosed.

Figure 1:
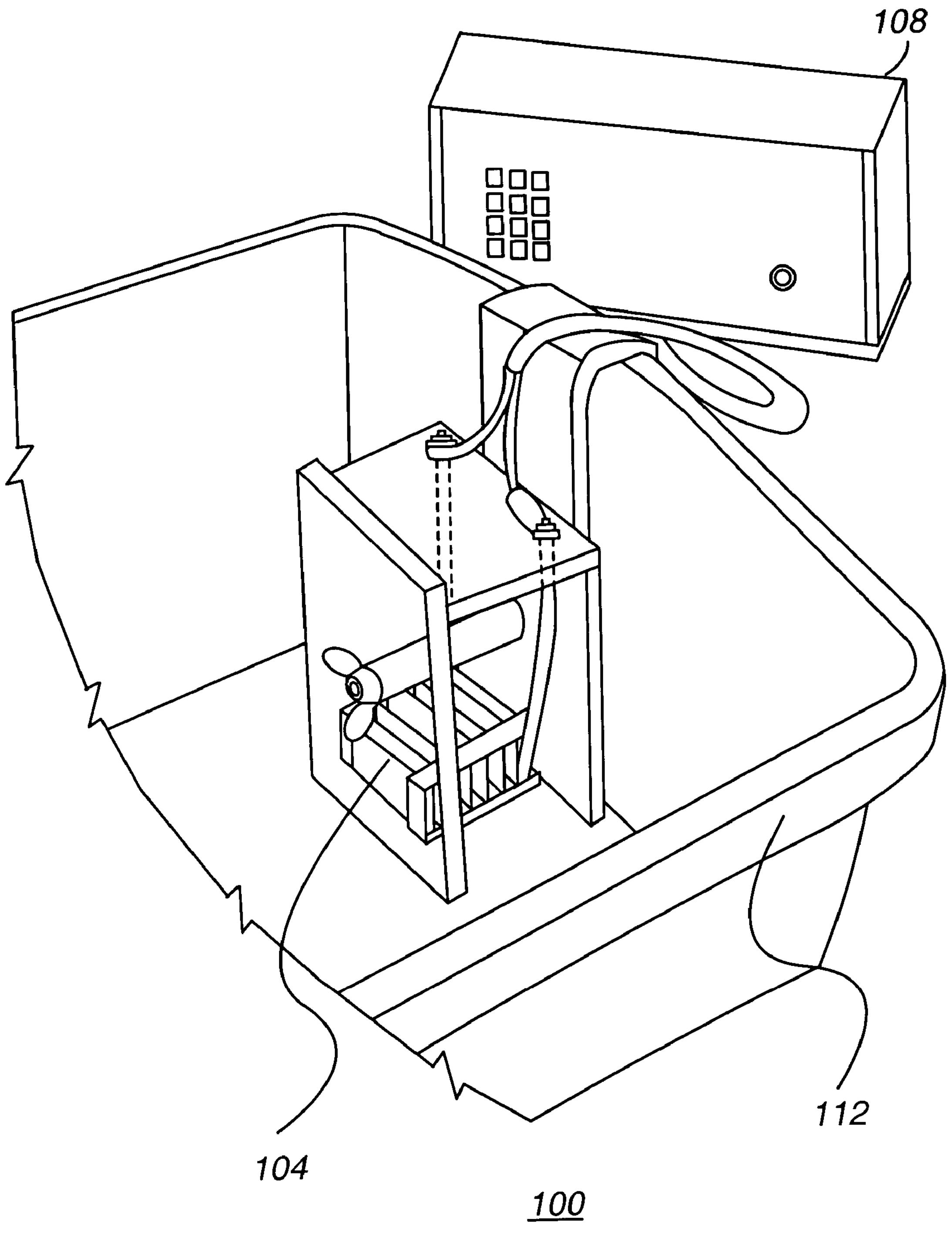
FIG. 1 illustrates a therapeutic electrolysis system in accordance with an embodiment of the present invention.

In FIG. 1, a therapeutic electrolysis system 100 in accordance with an embodiment of the present invention is depicted. In general, the therapeutic electrolysis system includes an ionizer unit 104 interconnected to a control unit 108. In addition, the therapeutic electrolysis system 100 includes a basin 112. Furthermore, in operation, the therapeutic electrolysis system 100 utilizes water 236 (see FIG. 2) held in the basin 112.

Figure 2:
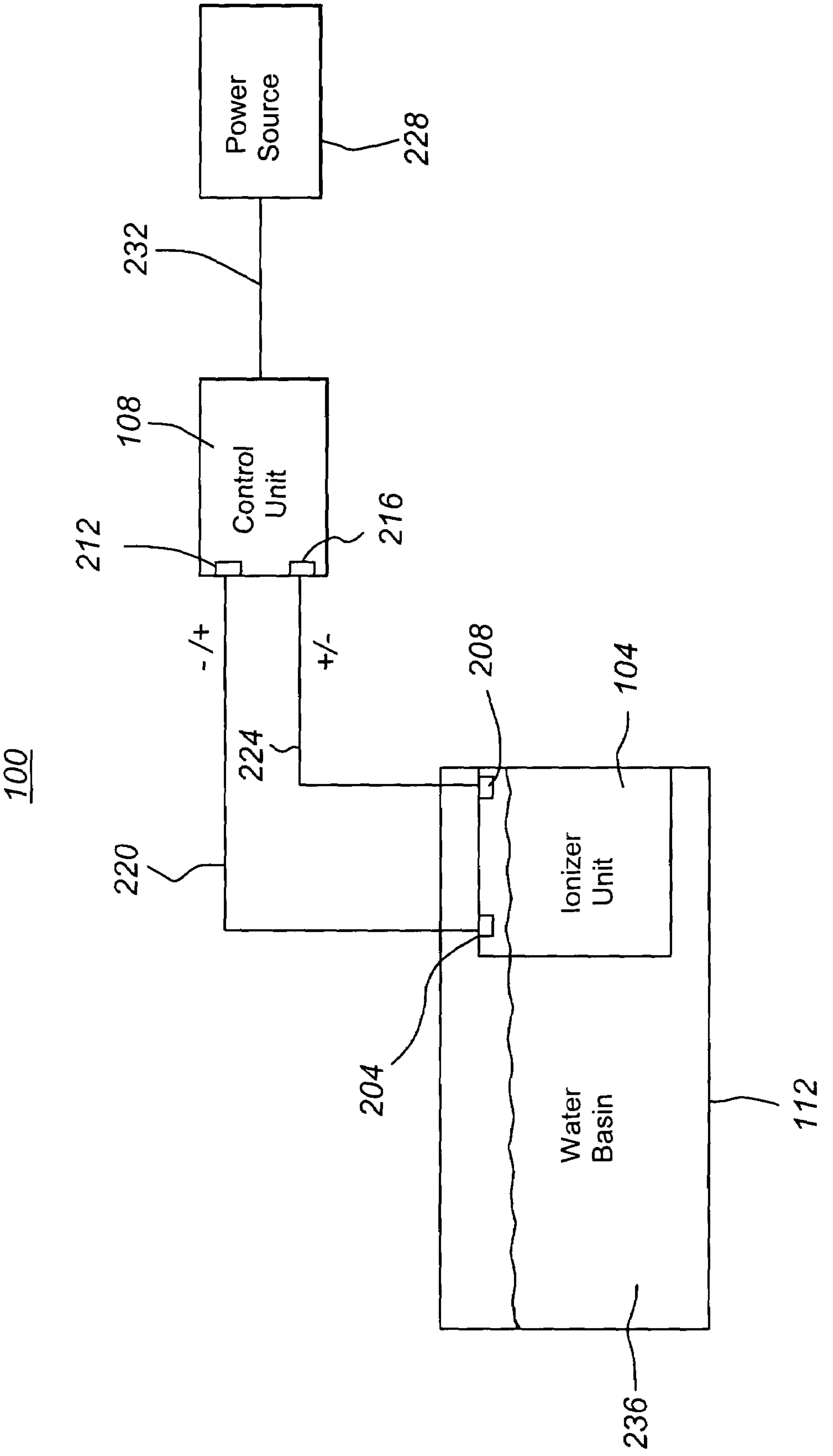
FIG. 2 is a block diagram illustrating the interrelationship between components of a therapeutic electrolysis system in accordance with an embodiment of the present invention.

FIG. 2 depicts a therapeutic electrolysis system 100 in accordance with an embodiment of the present invention in block diagram form. As can be seen in FIG. 2, the ionizer unit 104 includes a first electrical terminal 204, which is interconnected to a first switchable electrical terminal 212 on the control unit 108 by a first electrical conductor or conduit 220. Similarly, the second electrical terminal 208 of the ionizer unit 104 is interconnected to a second switchable terminal 216 of the control unit 108 by a second electrical conductor or conduit 224. In general, the first 212 and second 216 switchable terminals of the control unit 108 are switchable in that the polarity of a voltage across the switchable terminals 212, 216 may be selectively reversed. In accordance with an embodiment of the present invention, the control unit 108 supplies 24V DC at the switchable terminals 212, 216. A power source 228 provides electrical power to the control unit 108 over power supply cord 232. In accordance with an embodiment of the present invention, the power source 228 is a line voltage source.

The water basin 112 is shown in FIG. 2 as holding a quantity of water having ions 236, such as ordinary tap water. The water 236 partially submerges the ionizer unit 104. In particular, the water 236 is preferably held to a level that does not submerge the first 204 and second 208 electrical terminals of the ionizer unit 104.

Figure 3:
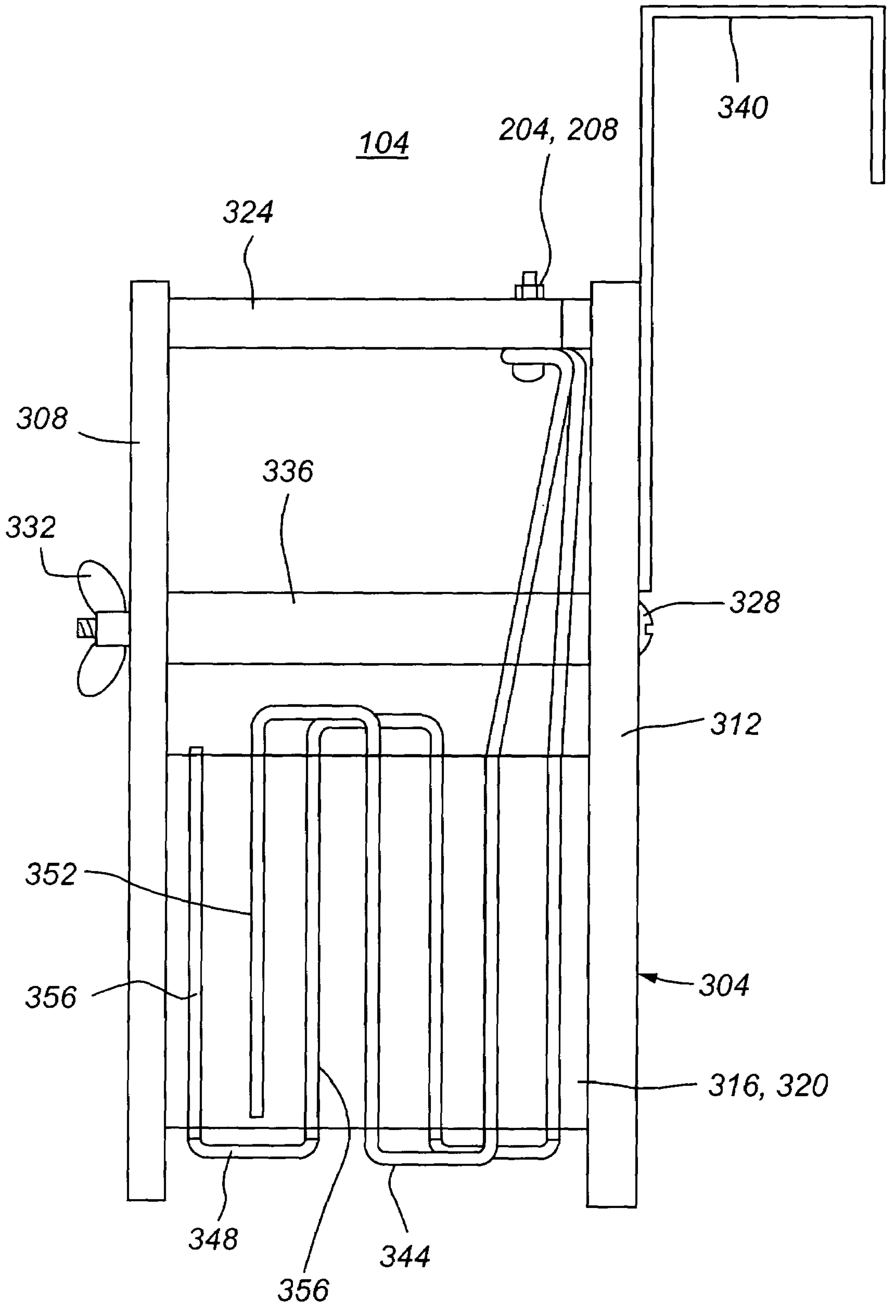
FIG. 3 is a side view of an ionizer unit in accordance with an embodiment of the present invention.

With reference now to FIG. 3, an ionizer unit 104 in accordance with an embodiment of the present invention is shown in a side view. In general, the ionizer unit 104 includes a frame assembly 304 having a front plate 308, a back plate 312, a pair of side plates 316, 320, and a top plate 324. The frame assembly 304 is preferably formed from a non-conductive material. In accordance with an embodiment of the present invention, the frame assembly 304 is formed from plastic. The frame assembly 304 may be held together by an adhesive. Alternatively, or in addition, the frame assembly 304 may be held together by a screw 328 and associated nut 332. The screw 328 may be inserted through a sleeve 336. The sleeve 336 may function as a spacer to maintain a desired distance between the front 308 and back 312 plates. In addition or alternatively, the sleeve 336 may comprise a catalytic material or compound. For example, the sleeve 336 may comprise zinc or copper. The nut 332 may be configured to allow a user to easily change the catalytic material comprising the sleeve 336. For example, in accordance with an embodiment of the present invention, the nut 332 is a wing nut. Where a sleeve 336 formed from a catalytic material is used, the level of the water 236 when the ionizer unit 104 is in use should be such that the sleeve 336 is partially or fully submerged.

The top plate 324 of the frame 304 provides a mounting point for the first 204 and second 208 electrical terminals. A hanger 340 is provided for suspending the ionizer unit 104 over the edge of the basin 112 (see FIG. 1).

The frame 304 supports a first integral plate assembly 344 and a second integral plate assembly 348. The first integral plate assembly 344 generally comprises an odd number of substantially parallel plates 352. The second integral plate assembly 348 generally comprises an even number of substantially parallel plates 356. The frame 304 holds the first plate assembly 344 in a fixed position with respect to the second plate assembly 348. Specifically, the frame 304 holds the plate assemblies 344, 348 such that the plates 352 of the first plate assembly 344 are interleaved with and spaced apart from the plates 356 of the second plate assembly 348. More specifically, a plate 352 of the first plate assembly 344 is interspersed between each adjacent plate 356 of the second plate assembly 348.

Figure 4:
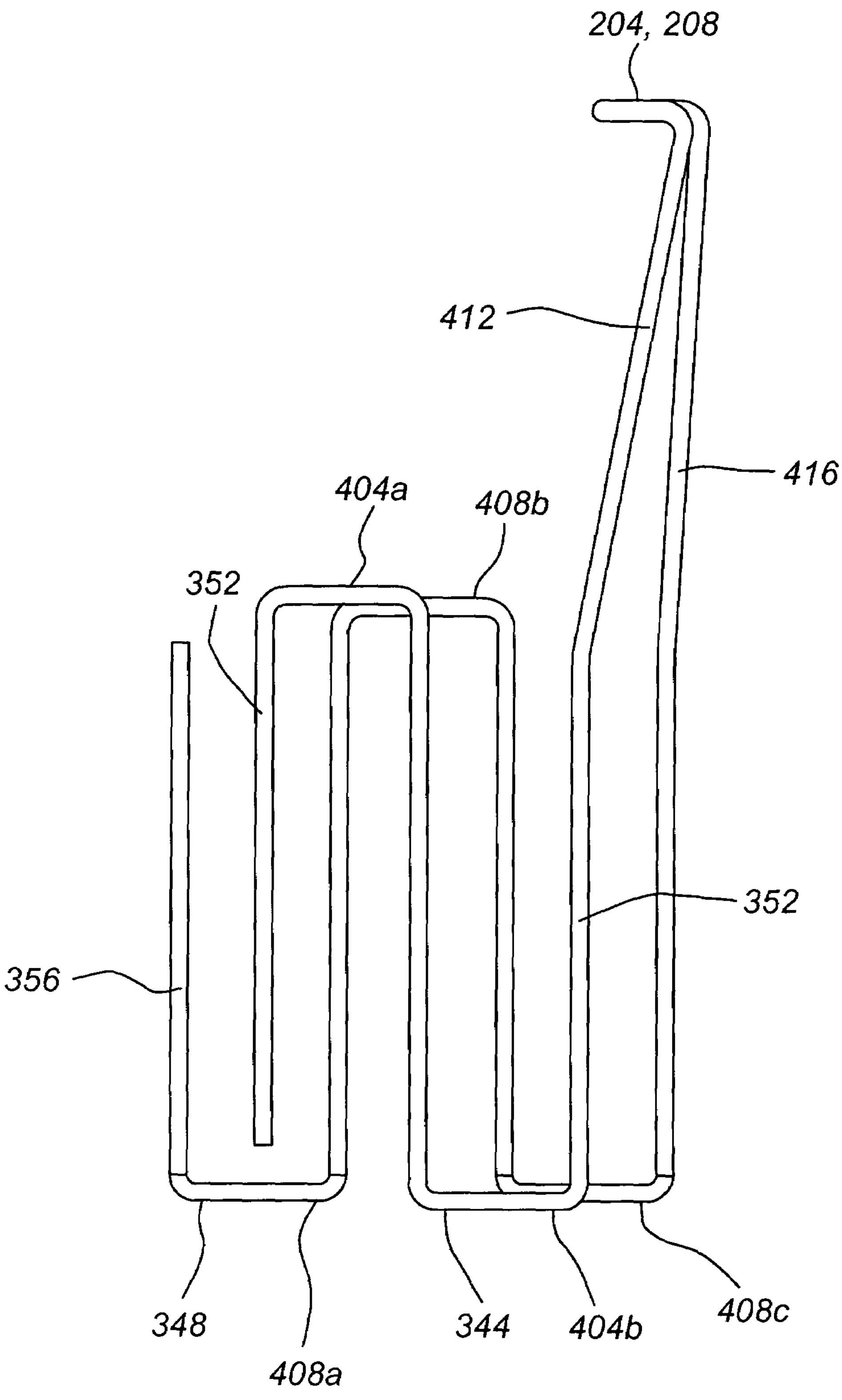
FIG. 4 is a side view of the plate assemblies of the ionizer unit in their assembled relationship to one another, in accordance with an embodiment of the present invention.
Figure 5:
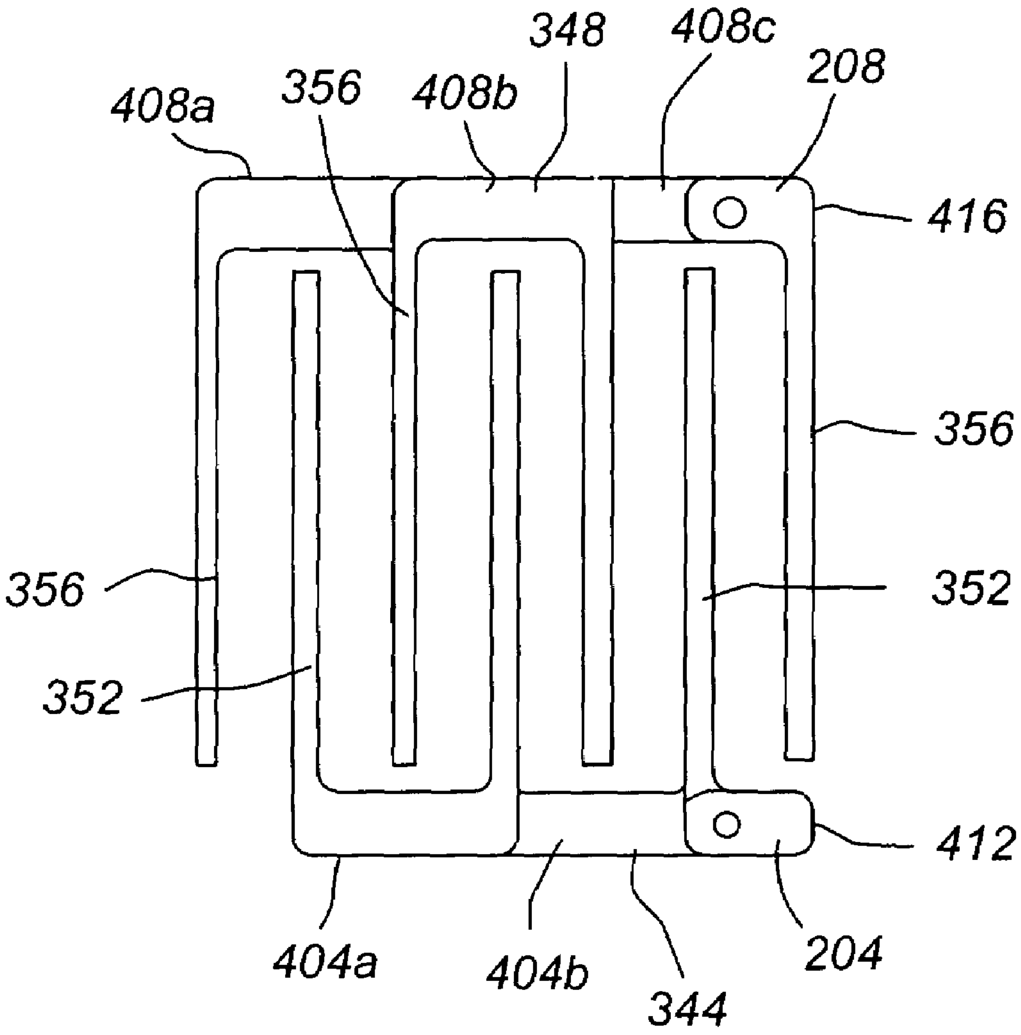
FIG. 5 is a top view of the plate assemblies of FIG. 4.

With reference now to FIGS. 4 and 5, the first 344 and second 348 plate assemblies are shown in a side view (FIG. 4) and a top view (FIG. 5). As noted above, the first plate assembly 344 comprises an odd number of plates 352, while the second plate assembly 348 comprises an even number of plates 356. The plates 352 of the first plate assembly 344 are electrically interconnected to one another in series by connecting portions 404, shown as first connecting portion 404*a* and second connecting portion 404*b*. Similarly, the plates 356 of the second plate assembly 348 are electrically interconnected to one another in series by connecting portions 408, shown as first connecting portion 408*a*, second connecting portion 408*b*, and third connecting portion 408*c*. The first integral assembly 344 also includes a terminal portion 412 that electrically interconnects the plates 352 to the first terminal 204. Similarly, the second integral plate assembly 348 includes a terminal portion 416 for electrically interconnecting the plates 356 to the second electrical terminal 208. The terminal portions 412, 416 are generally formed so that the electrical terminals 204, 208 are above the water 232 when the ionizer unit is in operation.

Figure 6A:
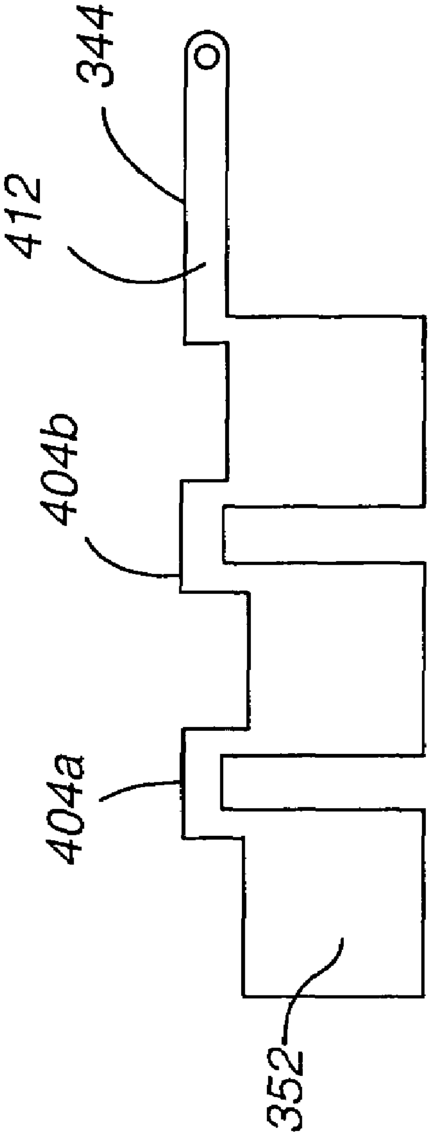
FIGS. 6A and 6B are plan views of plate assemblies in accordance with an embodiment of the present invention, prior to folding of the assemblies.

With reference now to FIG. 6A, a first integral plate assembly 344 is illustrated in a prefolded, preassembled condition. As shown in FIG. 6A, the first integral plate assembly 344 is formed from a single piece of material. For example, the first integral plate assembly 344 may be formed from a sheet of electrically conductive stainless steel having a thickness of about 0.05". In general, the first integral plate assembly 344 is formed by cutting a blank, illustrated in FIG. 6A, from a sheet of material. The material is then folded such that the plates 352 are substantially parallel to one another, and such that the terminal 412 extends away from the plates 352 (see FIGS. 3, 4 and 5).

Figure 6B:
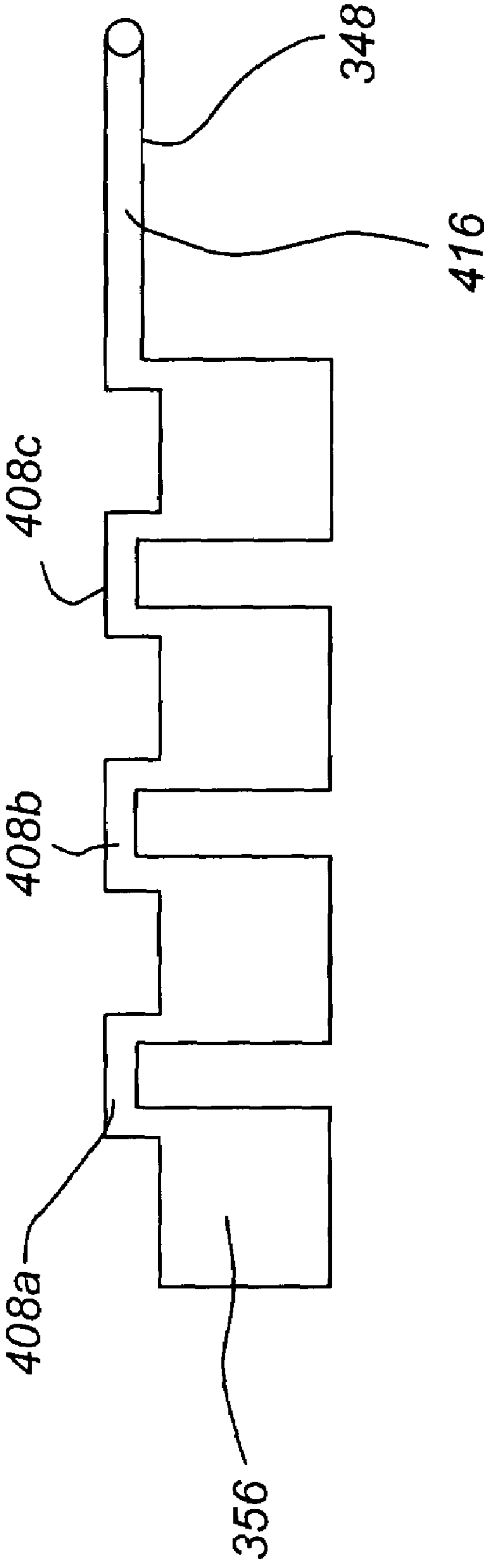

Similarly, in FIG. 6B, a second integral plate assembly 348 is illustrated in prefolded, preassembled form. The second plate assembly 348 is formed from a single piece of material, such as a sheet of electrically conductive stainless steel that is about 0.05" thick. In general, the second integral plate assembly 348 is formed by cutting a blank, illustrated in FIG. 6B, from a sheet of material. The material is then folded such that the plates 356 are substantially parallel to one another, and such that the terminal 416 extends away from the plates 352 (see FIGS. 3, 4 and 5).

In accordance with an embodiment of the present invention, the plates 352 of the first integral plate assembly 344 each have a surface area that is about equal to the surface area of the plates 356 of the second integral plate assembly 348. However, because an odd number of plates 352 are provided in connection with a first integral plate assembly 344, and an even number of plates 356 are provided as part of the second integral plate assembly 348, the surface areas of the first 344 and second 348 integral plate assemblies differ. According to alternative embodiments, the first plate assembly 344 may have plates 352 that are a different size from the plates 356 of the second plate assembly 348, so that the total surface areas of the plate assemblies 344, 348 differs, even if the plate assemblies 344, 348 have the same number of plates 352, 356. As shown in FIGS. 6A and 6B, the plates 352, 356 can have a square shape. However, as can be appreciated by one of skill in the art, other shapes, such as rectangular, circular, or octagonal can be used.

In addition, it will be appreciated that the use of a single, integral piece of material to form the first integral plate assembly 344, and the use of a single, integral piece of material to form the second integral plate assembly 348, removes the need to interconnect discrete pieces of material. In particular, the use of single pieces of material for each of the plate assemblies 344, 348 removes the need to create interconnections between discrete pieces of material that will be submerged when an ionizer unit 104 comprising the integral plate assemblies 344, 348 is in use. This simplifies manufacture, and improves the reliability of the ionizer unit 104 as compared to conventional devices.

As shown in FIGS. 3, 4 and 5, the integral plate assemblies 344, 348 are not in metal to metal contact with one another. However, when the ionizer unit 104 is placed in water 236, electrolytic conduction between the plates is possible. In electrolytic conduction, charge is carried between the anode and cathode of the ionizer unit by ions in the water 236. By providing plate assemblies 344, 348 having unequal numbers of plates 352, 356, and therefore unequal surface areas, the ionizer unit 104 is believed capable of creating a preponderance of either negative ions or positive ions in the water 236. In accordance with another embodiment of the present invention, the plate assemblies 344, 348 may provide different surface areas by providing plates 352, 356 that are different sizes.

Figure 7:
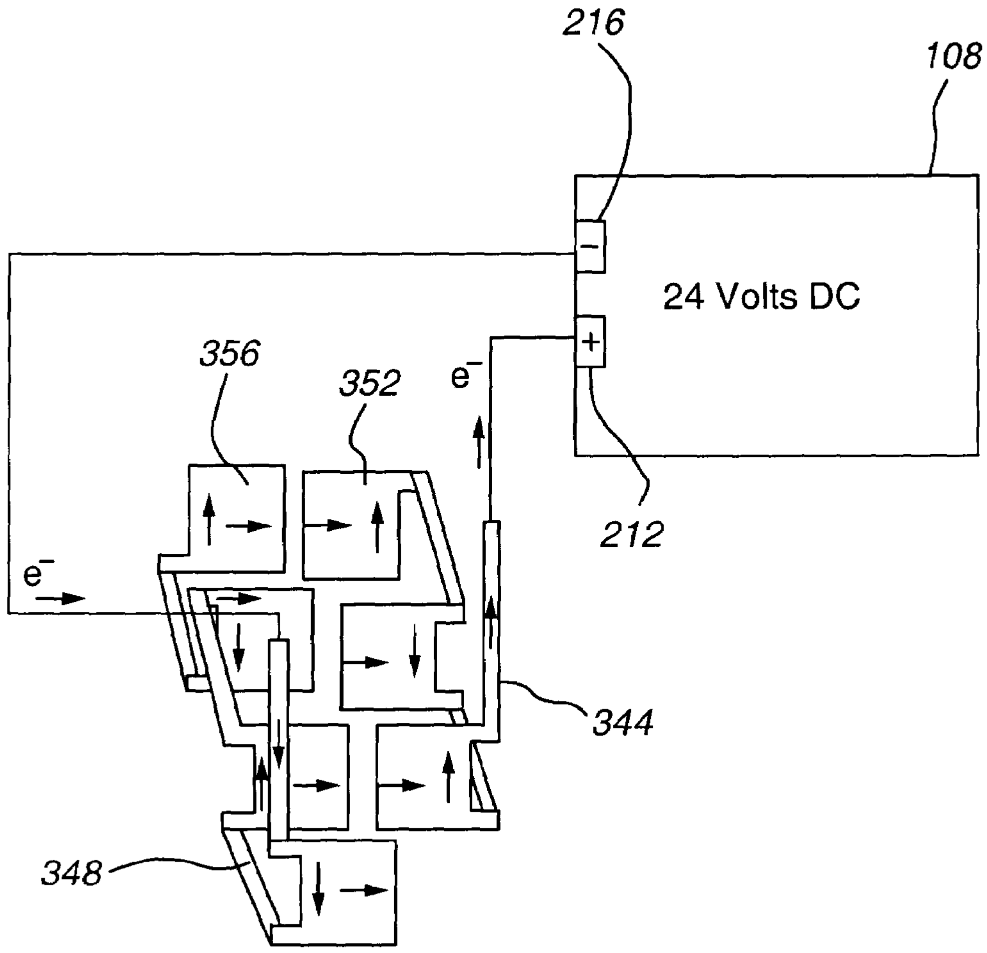
FIG. 7 is a schematic diagram depicting the flow of electrons through plate assemblies in accordance with an embodiment of the present invention.

With reference now to FIG. 7, the flow of electrons through integral plate assemblies 344, 348 in accordance with the present invention that have been submerged in water 232 is depicted. In FIG. 7, the first switchable terminal 212 of the control unit 108, which is interconnected to the first integral plate assembly 344, is shown as having a positive voltage supplied to it. The second switchable terminal 216, which is interconnected to the second integral plate assembly 348, is shown as having a negative voltage supplied to it. Accordingly, electrons flow from the second switchable terminal 216, through the series connected plates 356 of the second integral plate assembly 348, and across the gaps between plates 352 and plates 356 via electrolytes in the water 232 in which the first 344 and second 348 integral plate assemblies are substantially submerged. Electrons then flow into the series connected plates 352 of the first integral plate assembly 344, and back into the control unit 108 through the second switchable terminal 212.

FIG. 7 illustrates components of the therapeutic electrolysis system 100 in a first mode of operation, which tends to promote the existence of negative ions in the water bath 232. The control unit 108 can also be operated in a second mode of operation, in which the creation of positive ions in the water bath 232 is promoted. In this second mode of operation, the electrons are supplied from the first switchable terminal 212 (i.e. the first switchable terminal 212 provides a negative voltage and the second switchable terminal 216 provides a positive voltage).

Figure 8:
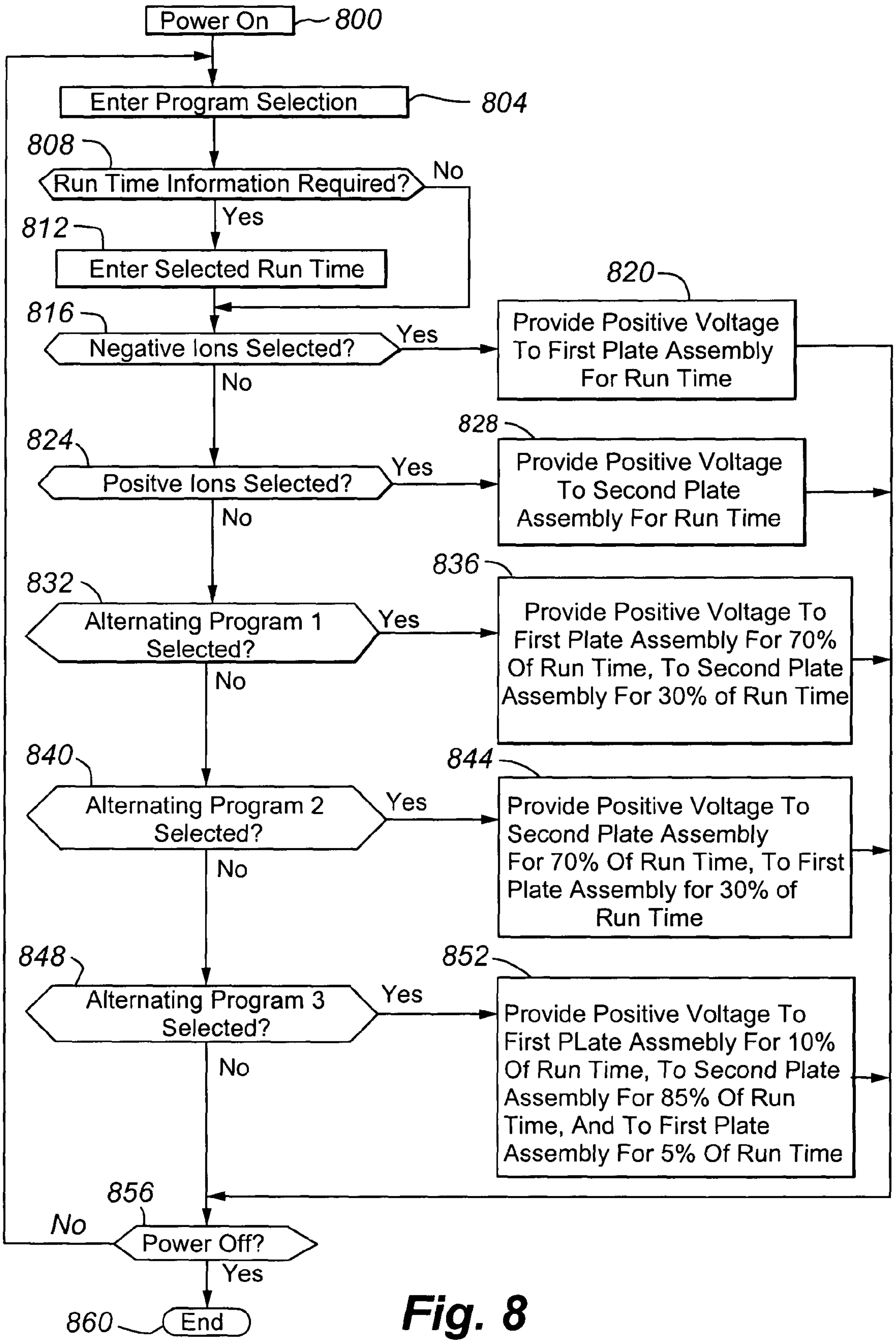
FIG. 8 is a flow diagram depicting operation of a therapeutic electrolysis system in accordance with an embodiment of the present invention.

With reference now to FIG. 8, the operation of a therapeutic electrolysis system 100 in accordance with an embodiment of the present invention is depicted. Initially, at step 800, the power to the control unit 108 is turned on. The user then enters a program selection (step 804). At step 808, a determination is made as to whether run time information is required from the user. For example, run time information is required if the selected program does not include a pre-selected run time. Alternatively, or in addition, the user may choose to override a pre-selected run time. If run time information is required, the user enters the desired run time at step 812. After a run time has been entered, or after it has been determined that run time information is not required, a determination is made as to whether the user has selected the production of a preponderance of negative ions (step 816). If such a selection has been made, the control unit 108 provides a positive voltage to the first plate assembly 344 for the selected period of time (step 820).

If the user has not selected production of a preponderance of negative ions, a determination is made as to whether the user has selected the production of a preponderance of positive ions (step 824). If the user has selected the production of a preponderance of positive ions, a positive voltage is provided to the second integral plate assembly 348 for the selected run time (step 828).

If a selection of a preponderance of positive ions has not been made, the system determines whether a first alternating program has been selected (step 832). If a selection of a first alternating program has been made, a positive voltage is provided to the first integral plate assembly 344 for 70 percent of the run time, and a positive voltage is provided to the second integral plate assembly 348 for 30 percent of the selected run time (step 836).

If the first alternating program has not been selected, a determination is made as to whether a second alternating program has been selected by the user (step 840). If the user has selected the second alternating program, a positive voltage is provided to the second integral plate assembly 348 for 70 percent of the selected run time, and a positive voltage is then provided to the first integral plate assembly 344 for 30 percent of the run time (step 844).

If the second alternating program has not been selected, a determination is made as to whether the user has selected a third alternating program (step 848). If the user has selected the third alternating program, a positive voltage is provided to the first plate assembly 344 for the first 10 percent of the run time. Then, a positive voltage is provided to the second integral plate assembly 348 for the next 85 percent of the run time. Finally, a positive voltage is then provided to the first plate assembly 344 for the final five percent of the run time (step 852).

If at step 848 the third alternating program is not selected, a determination is made as to whether the power has been turned off (step 856). If the power has been turned off, the procedure ends (step 860). If the power has not been turned off, the system returns to step 804.

As can be appreciated, the selection of a particular provided program or operating mode may be made directly, or by scrolling through a menu of possible selections using provided control buttons. Furthermore, it should be appreciated that the various programs discussed in connection with FIG. 8 are provided for illustrative purposes, and that additional or alternative programs or substitute programs may be provided. In addition, it should be appreciated that additional or alternative functions may be provided in connection with the control unit 108. For instance, the control unit 108 may be programmed to issue a warning if a selected run time of a particular type exceeds a predetermined amount. As a further example, the control unit 108 may allow a user to enter customized programs.

In the examples given above in connection with FIG. 8, several possible alternating programs are disclosed. Such programs are believed to have beneficial therapeutic effects. In particular, the alteration between creating a preponderance of negative ions and creating a preponderance of negative ions in the water bath 232 is believed to be beneficial because it reduces the likelihood that too many cations (or alternatively anions) will be removed from the body of a user.

Figure 9:
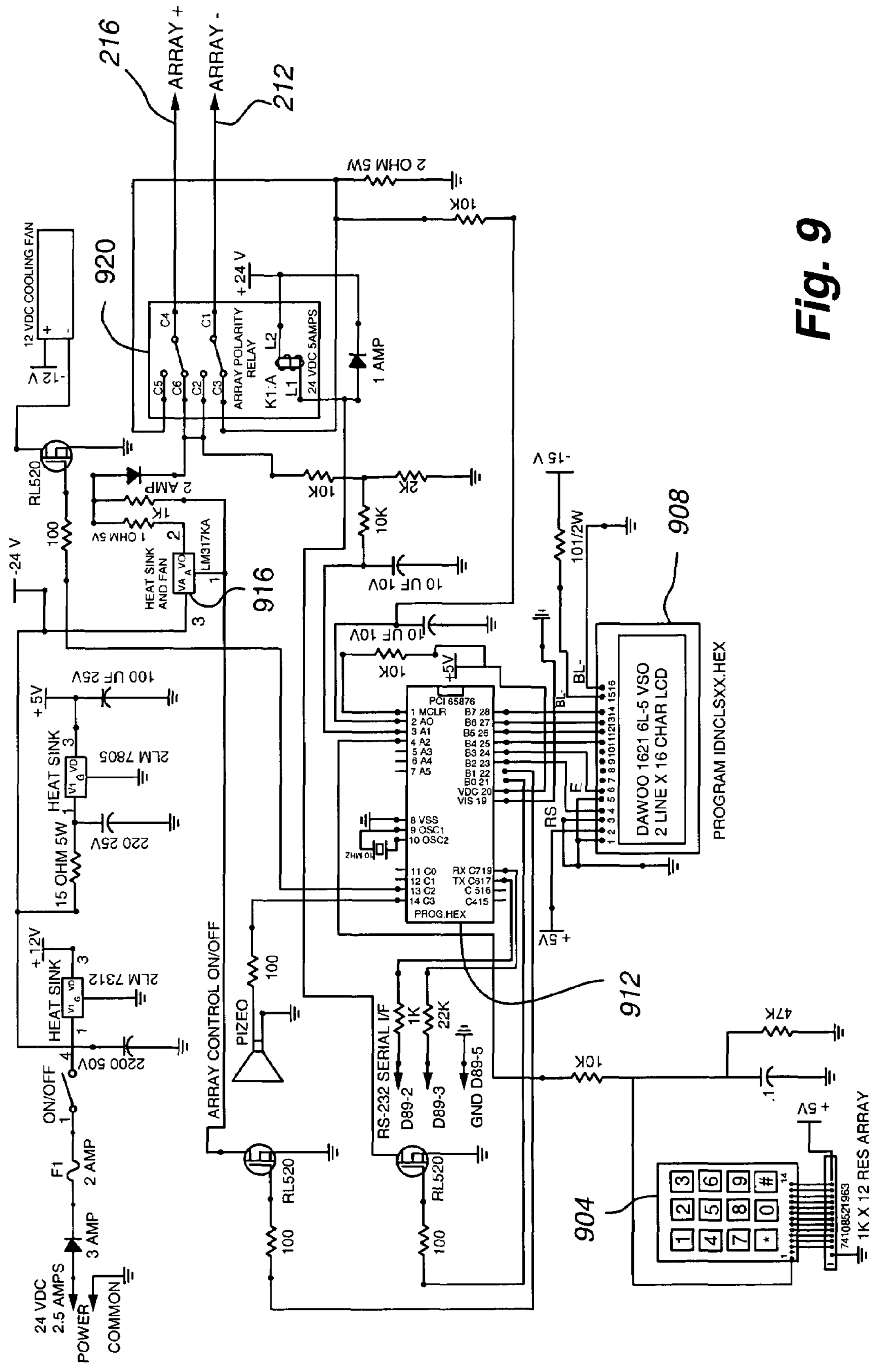
FIG. 9 is a circuit diagram for a control unit in accordance with an embodiment of the present invention.

With reference now to FIG. 9, a circuit diagram for a control unit 108 in accordance with an embodiment of the present invention is illustrated. As shown in FIG. 9, the control unit 108 may include a numeric keypad 904 for receiving input information from a user. Confirmation of user selections and indications of control unit 108 status may be provided by a visual display 908. A controller 912 receives input from the numeric keypad 904 and provides output to the display 908. In addition, the controller 912 controls the output provided to the terminals 212, 216 of the ionizer unit 104 according to programs stored in memory provided as part of or associated with the controller 912. In particular, the controller 912 may control the operation of a voltage regulator 916 and the operation of an array polarity relay 920 used to reverse the polarity at the terminals 212, 216 of the control unit 108.

Figure 10:
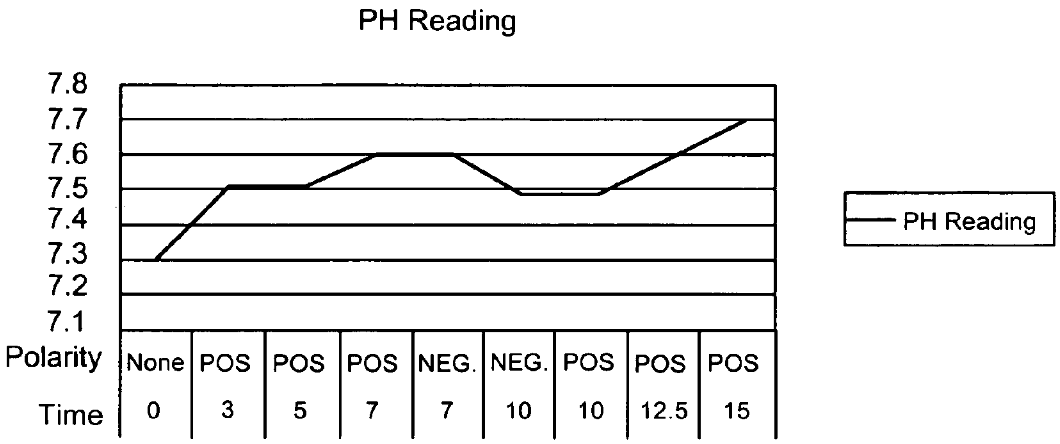
FIG. 10 is a graph showing test results for a system in accordance with an embodiment of the present invention.

With reference now to FIG. 10, a chart showing the results of testing using a therapeutic electrolysis system 100 in accordance with an embodiment of the present invention is illustrated. In particular, FIG. 10 illustrates the pH of tap water over time, and while different polarities are provided at the ionizer unit 104. The elapsed time, polarity at the first electrical terminal 204, and pH reading of the water shown in FIG. 10 are summarized in Table 1 below.

TABLE 1

| Time (min) | Polarity | PH Reading |
|---|---|---|
| 0 | none | 7.3 |
| 3 | POS. | 7.5 |
| 5 | POS. | 7.5 |
| 7 | POS. | 7.6 |
| 7 | NEG. | 7.6 |
| 10 | NEG. | 7.5 |
| 10 | POS. | 7.5 |
| 12.5 | POS. | 7.6 |
| 15 | POS. | 7.7 |

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A therapeutic electrolysis device, comprising:

a first integral plate assembly formed from a single sheet of planar conductive material, comprising:

a terminal portion;

an odd number of at least three plates, wherein said terminal portion interconnects said plates of said first integral plate assembly to a first electrical terminal and extends from one of said plates for a distance greater than a width of said terminal portion, and wherein said single piece of planar conductive material is folded so that each of said plates are substantially parallel to one another;

a second integral plate assembly formed from a single sheet of planar conductive material, comprising:

a terminal portion;

an even number of plates, wherein said terminal portion interconnects said plates of said second integral plate assembly to a second electrical terminal and extends from one of said plates for a distance greater than a width of said terminal portion, and wherein said single piece of planar conductive material is folded so that each of said plates are substantially parallel to one another, wherein each of said odd number of plates is interposed between two of said even number of plates, and wherein said odd number of plates are separated from said even number of plates by a gap;

a control unit, comprising first and second electrical output terminals; and electrical conductors, wherein said first electrical output terminal is interconnected to said terminal portion of said first integral plate assembly through said first terminal and said second output terminal is interconnected to said terminal portion of said second integral plate assembly through said second terminal.

2. The device of claim 1, wherein each of said plates of said first integral plate assembly have a surface area about equal to a first amount, and wherein each of said plates of said second integral plate assembly have a surface area about equal to said first amount.

3. The device of claim 1, wherein said single piece of conductive material of said first integral plate assembly comprises stainless steel.

4. The device of claim 1, wherein said control unit delivers a limited amount of current.

5. The device of claim 1, wherein said first integral plate assembly comprises three substantially parallel plates, wherein first and second connecting portions interconnect said three plates to one another in series, wherein said first and second connecting portions are part of said single piece of planar conductive material of said first integral plate assembly, wherein said single piece of planar conductive material of said first integral plate assembly is folded at or near said first and second connecting portions, wherein said second integral plate assembly comprises four substantially parallel plates, wherein third, fourth, and fifth connecting portions interconnect said four plates to one another in series, wherein said third, fourth, and fifth connecting portions are part of a single piece of planar conductive material of said second integral plate assembly, wherein said single piece of planar conductive material of said second integral plate assembly is folded at or near said third, fourth, and fifth connecting portions.

6. The device of claim 5, wherein said connecting portions have a length that is about equal to a spacing between interconnected plates.

7. The device of claim 1, further comprising: a frame, wherein said first and second integral plate assemblies are interconnected to said frame;

a first terminal connector interconnected to said terminal portion of said first integral plate assembly, wherein said first terminal connector is also interconnected to said frame; and a second terminal connector interconnected to said terminal portion of said second integral plate assembly, wherein said second terminal connector is also interconnected to said frame.

8. The device of claim 7, further comprising:

a sleeve formed from a catalytic material, wherein said frame includes at least a first pair of opposed plates, and wherein said sleeve extends between said at least a first pair of opposed plates and, wherein said sleeve covers a screw secured to said frame.

9. The device of claim 1, wherein said distance that said terminal portion of said first integral plate assembly extends from said one of said plates is greater than a width of said one of said plates.

10. A method for producing ions in water for therapeutic purposes, comprising:

forming a first plate assembly by the steps of:

i) providing a single sheet of planar conductive material, ii) shaping said material to form at least three plates, connecting portions between said plates, and a terminal portion extending from one of said plates, iii) folding said material so that a plane of each of said plates is substantially parallel to one another and is substantially centered about and perpendicular to a first axis;

iv) folding said terminal portion such that said terminal portion extends away from said first axis;

forming a second plate assembly by the steps of:

i) providing a single sheet of planar conductive material, ii) shaping said material to form at least two plates, connecting portions between said plates, and a terminal portion extending from one of said plates, iii) folding said material so that a plane of each of said plates is substantially parallel to one another and is substantially centered about and perpendicular to a second axis;

iv) folding said terminal portion such that said terminal portion extends away from said second axis;

interconnecting an end of said terminal portion of said first plate assembly opposite the plate from which said terminal portion extends to a first electrical terminal;

interconnecting an end of said terminal portion of said second plate assembly opposite the plate from which said terminal portion extends to a second electrical terminal;

submerging a portion of said first plate assembly in water, wherein said submerged portion of said first plate assembly has a first surface area, wherein at least some of said terminal portion of said first plate assembly is not submerged, and wherein said terminal portion of said first plate assembly holds said first electrical terminal above the surface of the water;

interconnecting said first electrical terminal to a first switchable terminal on a control unit;

submerging a portion of said second plate assembly in water, wherein said submerged portion of said second plate assembly has a second surface area, wherein at least some of said terminal portion of said second plate assembly is not submerged, and wherein said terminal portion of said second plate assembly holds said second electrical terminal above the surface of the water;

interconnecting said second electrical terminal to a second switchable terminal on said control unit;

supplying a positive voltage to said first electrical terminal and a negative voltage to said second electrical terminal for a first period of time; and supplying a negative voltage potential to said first electrical terminal and a positive voltage to said second electrical terminal for a second period of time.

11. The method of claim 10, wherein said first plate assembly includes an odd number of plates, wherein each of said odd number of plates has about a first surface area, and wherein said second plate assembly includes an even number of plates, wherein each of said even number of plates has about said first surface area.

12. The method of claim 11, wherein said odd number of plates comprises three plates and said even number of plates comprises four plates.

13. The method of claim 10, further comprising:

supplying a positive voltage to said first electrical terminal and a negative voltage to said second electrical terminal for a third period of time.

14. The method of claim 10, further comprising:

submerging a catalytic material in the water.

15. An ionizer device, comprising:

a first plate assembly, including a plurality of plates;

at least a first connecting portion; and a terminal portion, wherein said terminal portion extends from one of said plates for a distance that is greater than two-times a width of said terminal portion, wherein said plates of said first plate assembly are interconnected to one another in series, wherein said plates said at least a first connecting portion and said terminal portion of said first plate assembly are integral to one another, and wherein said first plate assembly has a first surface area;

a second plate assembly, including:

a plurality of plates;

at least a first connecting portion; and a terminal portion, wherein said terminal portion extends from one of said plates for a distance that is greater than two-times a width of said terminal portion, wherein said plates are interconnected to one another in series, wherein said plates, said at least a first connecting portion and said terminal portion of said second plate assembly are integral to one another, and wherein said second plate assembly has a second surface area that is different from said first surface area of said first plate assembly; and a frame, wherein said plates of said first plate assembly are held substantially parallel to and spaced apart from said plates of said second plate assembly.

16. The device of claim 15, wherein said first plate assembly includes an odd number of plates, and wherein said second plate assembly includes an even number of plates.

17. The device of claim 15, wherein said plates of said first plate assembly and said plates of said second plate assembly each have a surface area that is about equal to one another.

18. The device of claim 15, further comprising:

a spacer formed from a catalytic material, wherein said spacer is interconnected to said frame and wherein said spacer extends between two opposed surfaces of said frame.

19. The device of claim 15, wherein said frame comprises a dielectric material.

20. The device of claim 15, wherein said first and second plate assemblies are formed from stainless steel.

21. The device of claim 15, wherein said first plate assembly includes three plates, and wherein said second plate assembly comprises four plates.

22. The device of claim 15, wherein said first plate assembly includes three plates, and wherein said second plate assembly comprises four plates.

* * * * *

UNITED STATES PATENT AND TRADEMARK OFFICE

CERTIFICATE OF CORRECTION

PATENT NO. : 7,160,434 B2
APPLICATION NO. : 10/396188
DATED : January 9, 2007
INVENTOR(S) : Becker et al.

It is certified that error appears in the above-identified patent and that said Letters Patent is hereby corrected as shown below:

In Claim 15, column 10, line 33 add a --,-- after “said plates” and before “said at least”.

Signed and Sealed this

Thirteenth Day of March, 2007

JON W. DUDAS
*Director of the United States Patent and Trademark Office*